(12) United States Patent
Boecker (10) Patent No.: US 6,712,234 B2
(45) Date of Patent: Mar. 30, 2004

(54) FUEL TANK AND METHOD FOR ITS PRODUCTION

(75) Inventor: Albert Boecker, Karlsruhe (DE)

(73) Assignee: TI Group Automotive Systems Technology Center GmbH, Rastatt (DE)

( * ) Notice: Subject to any disclaimer, the term of this patent is extended or adjusted under 35 U.S.C. 154(b) by 274 days.

(21) Appl. No.: 09/781,763

(22) Filed: Feb. 12, 2001

(65) Prior Publication Data

US 2001/0013516 A1 Aug. 16, 2001

(30) Foreign Application Priority Data

Feb. 14, 2000 (DE) .......................... 100 06 635

(51) Int. Cl.⁷ .................... B29C 17/07; B29C 49/26; B32B 1/10
(52) U.S. Cl. .................. 220/563; 220/564; 220/4.13; 220/4.14; 264/503; 264/512; 264/516
(58) Field of Search ................ 220/562, 563, 220/564, 4.13, 4.4; 264/503, 512, 516

(56) References Cited

U.S. PATENT DOCUMENTS

| | | | | |
|---|---|---|---|---|
| 4,396,562 A | * | 8/1983 | Heaume | 264/515 X |
| 4,719,072 A | * | 1/1988 | Kojima et al. | 264/515 |
| 4,952,347 A | * | 8/1990 | Kasugai | 264/516 X |
| 5,308,573 A | * | 5/1994 | Hirakawa | 264/516 |
| 5,326,514 A | * | 7/1994 | Linden et al. | 264/516 X |
| 5,344,038 A | * | 9/1994 | Freeman et al. | 220/453 |
| 5,445,783 A | * | 8/1995 | Irish et al. | 264/515 |
| 5,514,323 A | * | 5/1996 | Ramioulle | 264/516 |
| 5,891,385 A | * | 4/1999 | Cerbelle et al. | 264/515 |
| 6,293,420 B1 | * | 9/2001 | Richter et al. | 220/563 |

* cited by examiner

Primary Examiner—Joseph Man-Fu Moy
(74) Attorney, Agent, or Firm—Reising, Ethington, Barnes, Kisselle, P.C.

(57) ABSTRACT

A fuel tank has a plurality of fuel system components therein and is formed by incorporating the fuel system components into the fuel tank as it is being formed. The fuel system components may be mounted on a carrier and then disposed with the carrier within a parison subsequently molded to form the fuel tank around the components and carrier. Desirably, all electrical, fuel and vapor lines may extend out of a single opening of the fuel tank to reduce openings in the formed fuel tank.

32 Claims, 5 Drawing Sheets

FUEL TANK AND METHOD FOR ITS PRODUCTION

REFERENCE TO RELATED APPLICATION

Applicant claims the priority of German patent application, Ser No. 100 06 635.6 filed Feb. 14, 2000.

FIELD OF THE INVENTION

This invention relates generally to a fuel tank having fuel system components contained therein and a method of making the fuel tank.

BACKGROUND OF THE INVENTION

In conventional fuel tanks certain components essential to the operation of the fuel system, such as the fuel pump, fuel filter, fuel level sensor for the fuel gauge, and one or more vent valves are disposed within the tank after the fuel tank is formed. Additionally, electrical lines and lines for transporting fuel, or fuel vapors are needed to interconnect the components with each other and with the remainder of the fuel system outside of the fuel tank. In the past, these components and corresponding lines have been separately mounted within or onto the tank using separate individual holders. The mounting of the components is performed after the fuel tank is produced in its final shape, such as, for example, by blow molding. In order to make this possible, a number of openings must be provided in the walls of the fuel tank, and the openings must be large enough to enable the insertion and mounting of the components in the tank. Additional components such as safety valves, hoses, sensors and the like are mounted on the outside of the tank.

In addition to the significant effort of designing components to fit in the tank and actually mounting the components in or on the tank, the openings in the tank wall increase the hydrocarbon and other emissions from the fuel tank. Moreover, due to the components mounted on the outside of the tank, the space required for mounting the tank in the vehicle is increased.

SUMMARY OF THE INVENTION

A fuel tank has a plurality of fuel system components therein and is formed by incorporating the fuel system components into the fuel tank as it is being formed. The fuel system components may be disposed within a parison which is subsequently molded to form the fuel tank. The fuel system components may be mounted on a carrier and then the carrier with the fuel system components thereon is disposed in the parison which is subsequently molded to form the fuel tank. Accordingly, the fuel system components preferably on the carrier are within the formed fuel tank. Desirably, all electrical, fuel and vapor lines may extend out of a single opening of the fuel tank to reduce openings in the formed fuel tank.

The carrier element may also function as a baffle or divider plate, which divides the volume of the tank into smaller portions and eliminates or reduces surging or splashing of large amounts of fuel. Advantageously, the carrier is at least locally connected, and preferably bonded or welded, to the inside of the fuel tank. To this end, the carrier may have a plurality of feet or connecting elements spaced along its edges, which consist of a plastic material that is weldable or bondable to the inside of the tank wall. The remainder of the carrier may therefore consist of a plastic material, which is not weldable or bondable to the material of the tank, or it may consist of a metal. The feet may also be formed as separate connecting elements, which are, for example, clipped or molded onto the carrier. According to a preferred embodiment of the invention, a gap is formed between the inside wall of the tank and the carrier element in the regions between two adjacent feet, through which fuel may flow, so that an even fuel level is attained within the divided portions of the tank. The function of a splash reducing baffle or divider is best achieved when the carrier is disposed essentially transversely with respect to the longitudinal axis of the tank as it is mounted in a vehicle. The shape of the carrier is not limited to an essentially flat shape, rather it may be of advantage if it has a cross section which is wavy, zigzagged, meandering or the like.

In general, the fuel system components preferably have a life expectancy that makes replacement during the service life of the vehicle unnecessary. In the event a component becomes defective, preferably it may be easily removed from the carrier and the tank and easily replaced by a new unit. According to a preferred embodiment of the invention the carrier therefore has guideways for connectors of the fuel system components which lead from the respective mounting position of each component to a closable service opening or a cap of the tank. This makes it possible to replace components which are not located in the direct vicinity of the fuel tank opening. The guideways may be formed as undercut grooves or slots transversing the carrier or as guide rails along which the connectors of the components are guided.

A number of the components, for example a fuel pump and a fuel filter, may be connected to each other by means of fuel lines. A further simplification of the arrangement and a saving in materials is achieved when the carrier comprises internal passages or channels, which connect the components to each other and to other fuel system components. These internal passages or channels are used in place of the otherwise present conduits or lines; i.e. the fuel and/or vapor is led through the passages or channels within the carrier. Only short connecting lines, fittings or adapters between the respective component and the carrier are then needed.

One method for producing a fuel tank according to the invention comprises the following steps: First, all of the fuel system components which are to be disposed inside the fuel tank are mounted on each other or on the carrier. This pre-assembled unit is then placed inside of a parison, which is subsequently blow-molded in the usual manner. During the blow molding process, the feet or connecting elements of the carrier are engaged with and preferably become attached, and may be welded, bonded or adhered, to the inside of the fuel tank wall. The fuel tank created in this manner is ready to be mounted in a vehicle with only a few further assembly steps.

Objects, features and advantages of the invention include providing a fuel tank and method of making it which reduces the time, labor and cost to form a fuel tank with necessary fuel system components mounted therein, integrates the fuel system components in the tank in a simple manner, reduces the number of openings needed in the fuel tank, reduces the emissions from the fuel tank, reduces sloshing or splashing of liquid fuel in the fuel tank, facilitates mounting fuel system components in any desired location in the tank, facilitates mounting and assembly of the fuel tank into a vehicle, is of relatively simple design, economical manufacture and assembly and in service has a long, useful life.

BRIEF DESCRIPTION OF THE DRAWINGS

These and other objects, features and advantages of this invention will be apparent from the following detailed description of the preferred embodiments and best mode, appended claims and accompanying drawings in which:

DETAILED DESCRIPTION OF THE PREFERRED EMBODIMENTS

Referring in more detail to the drawings, FIGS. 1–4 illustrate a fuel tank 10 having a plurality of fuel system components mounted within the fuel tank 10, preferably on a carrier 12, and a method of making such a fuel tank. Desirably, to eliminate the need to assemble the fuel system components into the fuel tank 10 after it is formed, the carrier 12 with the fuel system components thereon is disposed within a parison 18, before the parison 18 is molded into the final fuel tank shape. As shown, the fuel tank 10 has a saddle shape with two tank chambers 14, 14' which are connected to each other by way of a passage 16. The fuel tank 10 consists of a plastic material and is preferably manufactured by blow molding. Other tank shapes and processes of forming the tank, such as, without limitation, vacuum molding may be used.

Figure 4:
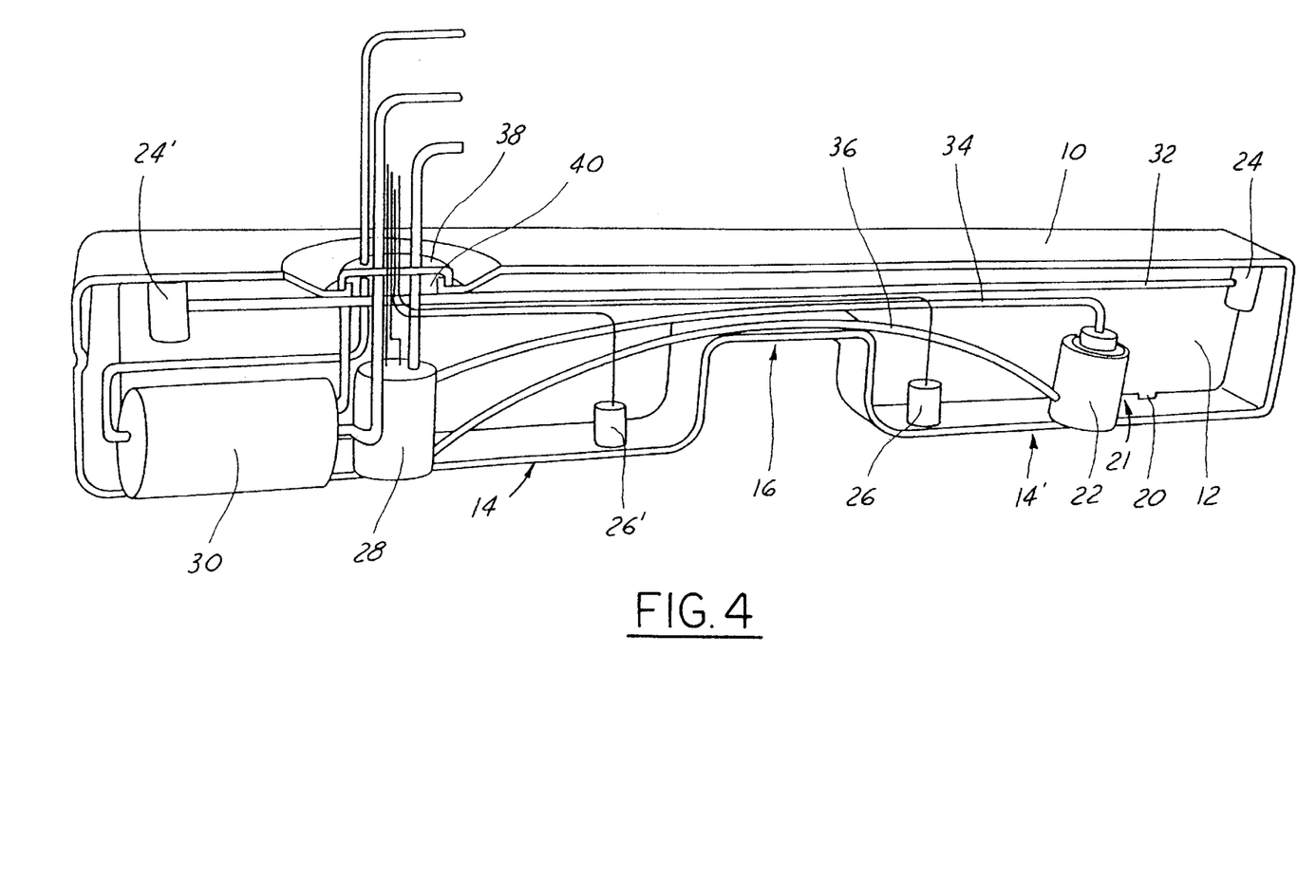
FIG. 4 is a somewhat diagrammatic perspective view in section of a fuel tank comprising an embodiment of the carrier with fuel system components mounted thereon.

The carrier 12 is essentially flat; may be "I-shaped" in cross-section and its contour is matched generally to the inner contour of the fuel tank 10. Preferably, the carrier 12 acts as a baffle or divider plate which divides or sections the fuel tank 10 interior into smaller volume segments or portions to reduce or eliminate the surging and splashing of large volumes of fuel in the tank. Preferably, to maintain an equal fuel level in all segments of the fuel tank interior, the carrier 12 has connecting elements or feet 20, which define passages, flow paths 21 or gaps between the lower edges of the divided fuel tank segments and the bottom wall of the fuel tank in the regions between the feet 20. Desirably, the feet 20 engage and may become attached to the fuel tank walls when the fuel tank 10 is formed to limit or prevent relative movement between the carrier 12 and fuel tank 10.

Figure 5:
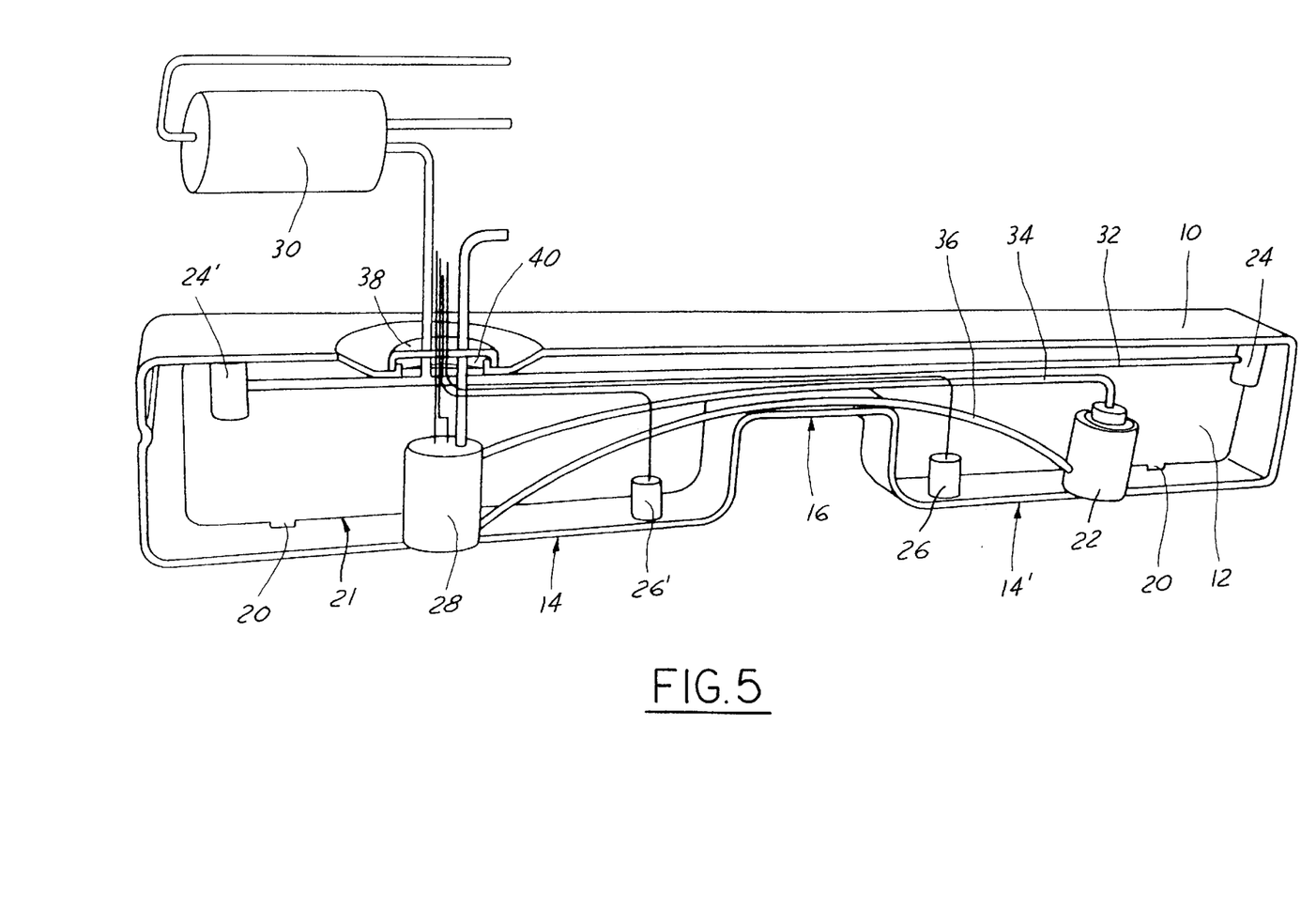
FIG. 5 is a variant of the fuel tank according to FIG. 4, in which an activated charcoal canister is mounted on the outside of the fuel tank.
Figures 6, 7:
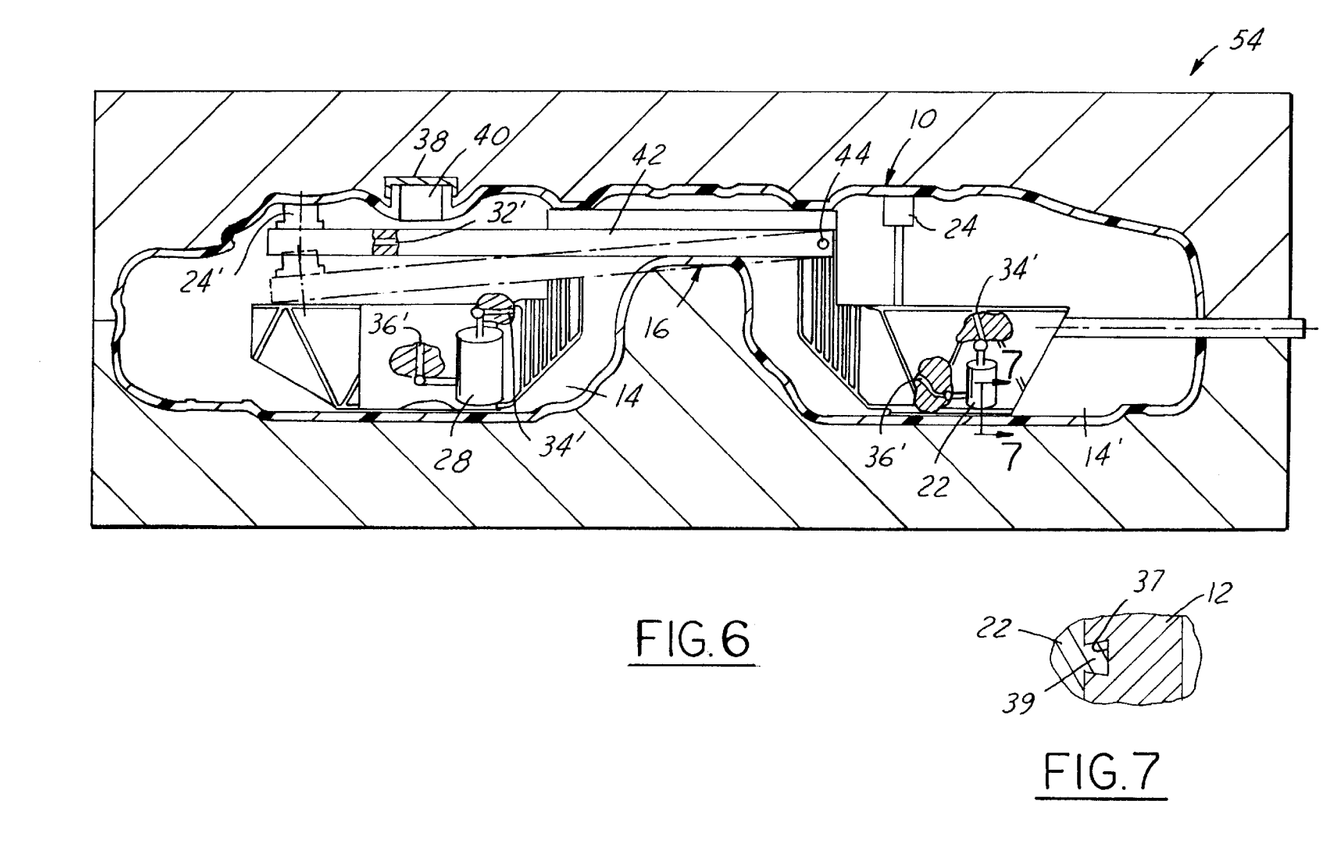
FIG. 6 is a cross-sectional view of a closed mold with a fuel tank being blow molded therein and a modified carrier in the fuel tank.
FIG. 7 is a fragmentary sectional view taken along line 7—7 of FIG. 6 illustrating a connector for a valve in a guideway of the carrier.

In the embodiment shown in FIG. 4, in tank chamber 14' a jet pump 22, a first venting valve 24 and a first fuel level sensor 26 are mounted on the carrier element 12. In tank chamber 14 an electric fuel pump 28 with an integrated pressure regulator and fuel filter, an activated charcoal filter or fuel vapor canister 30, a second venting valve 24', and a second fuel level sensor 26' are mounted on the carrier element 12. These components are connected, where applicable, to each other by means of connecting conduits, tubes or lines 32, 34, 36. Alternatively, as shown in FIG. 6, the connecting lines 32', 34', 36' may be integrated as fuel passages or channels 32', 34', 36' into the carrier element 12. Further, the carrier element 12 may comprise guideways or tracks 37 (FIG. 7) for the mounting or connecting elements 39 of the components, which lead from the respective component to a region close to a cap 38 covering a service opening 40 of the tank 10. Thus, components not readily accessible from the service opening 40 may be moved along the carrier 12 via the guideways 37 until they are adjacent to the service opening 40 and may be removed from the tank. This makes replacing a component easier (especially a component located in tank chamber 14' and which is not accessible through the tank opening 40). As an alternative to the embodiment of FIG. 4, as shown in FIG. 5, the fuel vapor canister 30 can also be located on the outside of the tank 10.

If desired, individual fuel system components may be disposed in the parison without any carrier 12 before it is molded to form the fuel tank. One or more of the fuel system components may have a larger size than any opening provided in the fuel tank as formed such that these components cannot be removed through the openings and could not be inserted into the tank through the openings if the tank were initially formed without the components therein. Additionally, fuel pump modules may be used as a carrier with one or more components mounted on the module which is placed in the parison before the tank is formed. The module by itself or with the components mounted thereon may have a size preventing its insertion into the tank or removal from the tank through any opening in the tank as formed. Similarly, the carrier 12 may have a size, either by itself or with any desired components mounted thereon, which prevents its insertion into the fuel tank after the tank is formed. Accordingly, the module and/or carrier could not be inserted into the fuel tank after it is formed.

Figure 1:
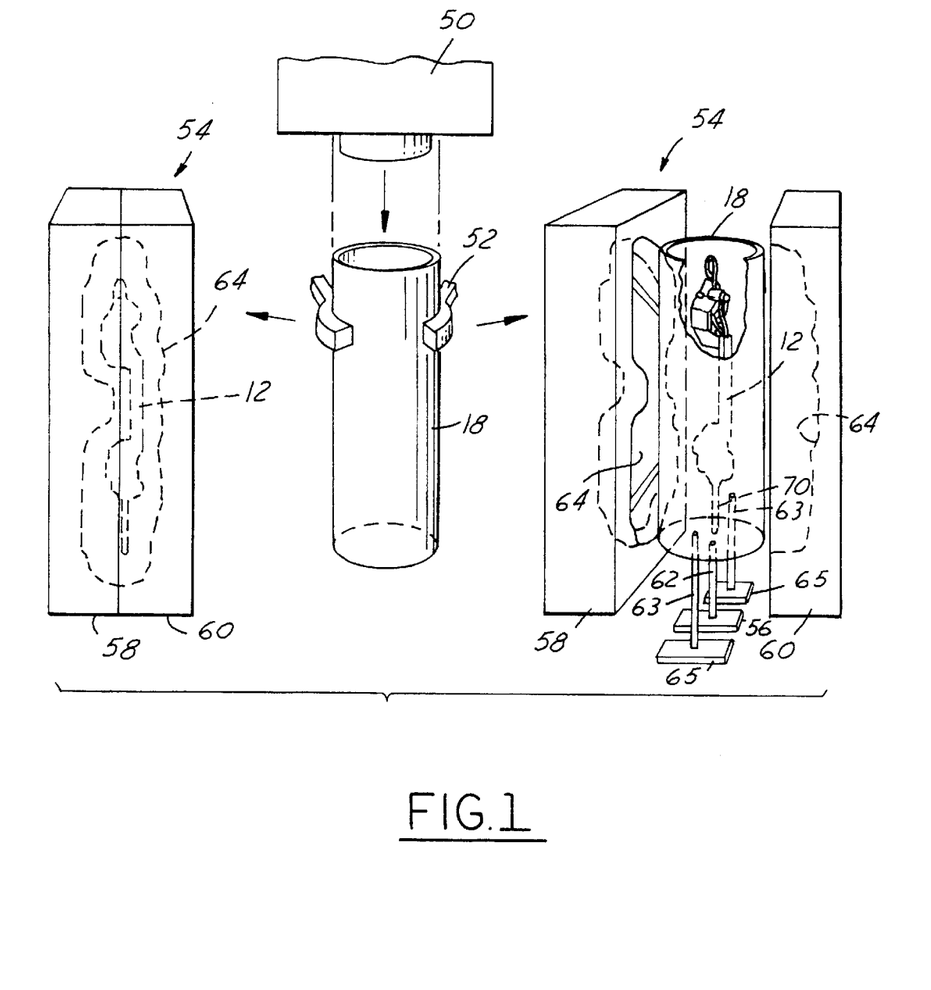
FIG. 1 is a diagrammatic view illustrating a system and method of forming a fuel tank with fuel system components therein in accordance with one aspect of the present invention.

As shown in FIG. 1, to form the fuel tank 10 with the fuel system components therein, a molten cylindrical parison 18 is produced by an extruder 50 and is transported by a transfer mechanism 52 to a mold 54 for blow molding into the final fuel tank shape. The parison 18 preferably comprises a plurality of layers of different thermoplastic polymer materials simultaneously extruded. For example, in a six layer co-extrusion the parison has inner and outer structural layers of polyethylene (such as HDPE), and may have a layer of so-called "re-grind" or recycled scrap material between the outer layers, and a fuel vapor barrier layer (of ethylene vinyl alcohol or other polymer resistant to fuel vapor permeation) sandwiched between two adhesive layers which connect the vapor barrier layer to the structural polymeric layers of re-grind or virgin HDPE.

To position the carrier 12 and components within the parison 18, the transfer mechanism 52 may vertically lower the parison 18 over the carrier 12 which is held in a generally vertical orientation on a fixture or stand 56 between open halves 58,60 of the mold 54. Preferably, the stand 56 for the carrier 12 also carries a blow pin assembly having a blow pin 62 through which pressurized air is provided to blow mold the parison 18.

With the parison 18 in place over the carrier 12 and between the open mold halves 58,60 the mold 54 may be closed to trap the parison 18 and close its ends with the blow pin 62 extending into the parison 18. The parison 18 is somewhat molten, flexible and sticky, so care must be taken to maintain the parison 18 separate from the carrier 12. If desired, a supply of pressurized air may be provided into the parison 18 to maintain it open and prevent it from collapsing or otherwise engaging the carrier 12 prior to closing the mold 54. Upon initiation of the supply of pressurized air, preferably the transfer and gripper mechanism 52 at least partially closes only the upper end of the parison 18. Preferably, a pair of spaced apart and parallel pins 63 on carriers 65 are inserted into the lower end of the parison 18 and moved laterally apart (and then withdrawn before or as the mold is closed) to better distribute and position the parison 18 in the mold 54. With the parison 18 in the closed mold 54, pressurized air may be provided through the blow pin 62 to expand the parison 18 into engagement with the walls defining a cavity 64 in the mold 54 to form the final fuel tank shape. The air may be at a pressure of about 10 bar and to facilitate cooling the parison 18 (which may be extruded at about 250° C.) the mold 54 may be chilled to about 10° C. After the parison 18 is fully blown and shaped in the closed mold and has cooled sufficiently to retain its shape, the supply of pressurized air is turned off, the blow pin 62 is withdrawn and the mold 54 is opened and the formed fuel tank assembly with the components and any carrier therein is removed from the mold 54.

Desirably, as the mold 54 is closed the parison 18 is engaged with and attaches or adheres to the feet 20 of the carrier 12 to limit or prevent relative movement between the carrier 12 and the fuel tank 10. The feet 20 are preferably constructed and arranged to break more easily (under lower force) than the fuel tank wall so that in the event of a vehicle collision, the carrier 12 may break away from the tank 10 to avoid undue stress and strain or breaking of the fuel tank walls by the forces of the carrier 12 on the tank. To adhere to the parison, the feet 20 are preferably a polymeric material directly bondable to the innermost layer of the parison 18, such as HDPE or re-grind material. The remainder of the carrier 12 can be made out of any material suitable for use in the liquid fuel to be used in the tank 10, including without limitation, metals and polymers such as HDPE or re-grind material.

Figure 2:
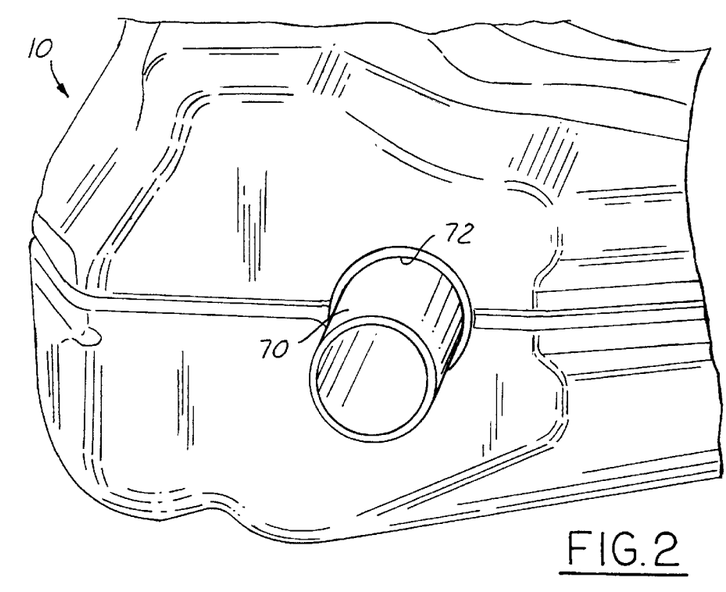
FIG. 2 is an enlarged fragmentary perspective view of a portion of the fuel tank illustrating a stem of a carrier extending out of the fuel tank.
Figure 3:
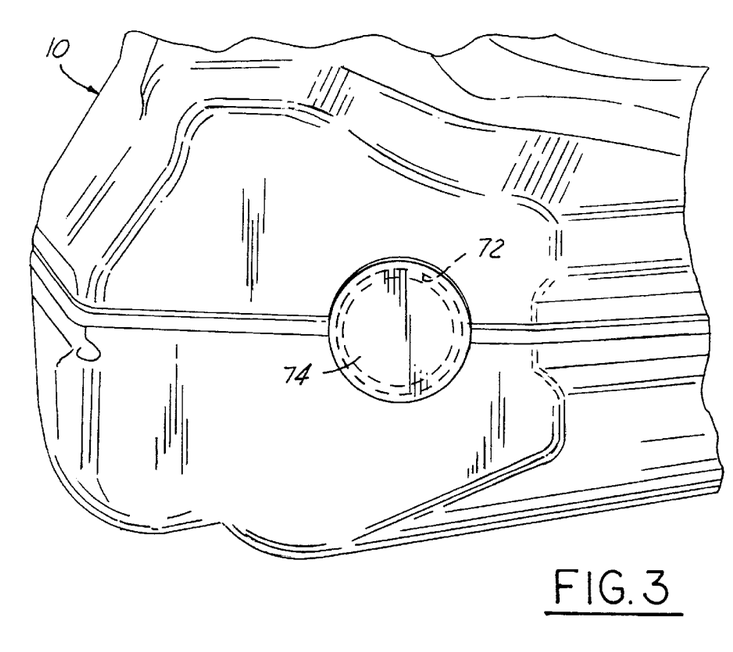
FIG. 3 is an enlarged fragmentary perspective view as in FIG. 2, with the stem removed and a cap applied to the fuel tank.

Since all required fuel system components are disposed on the carrier 12, the effort to assemble the fuel tank 10 is greatly reduced and only one tank opening is needed to receive fuel into the tank 10. The necessary electrical, fuel and vapor lines may extend out of this opening, or, one or more additional openings may be provided in the tank, as desired for a particular application. If desired, to reduce the number of openings such as the opening 40 they may when molded be initially closed off and completely sealed by the molded tank wall. The openings would then only be provided by breaking through or cutting open the tank wall when necessary to remove and replace a defective component in the tank. Then, after replacement of the defective component, the opening is closed and sealed by the cap 38. Additionally, as shown in FIG. 2, the carrier 12 may have a tubular stem 70 which was supported on the fixture or stand 56 and which extends out of the formed tank 10. The stem 70 may be cut-off and the resulting opening 72 in the tank 10 may be closed and sealed by a cap or plug 74. Preferably, the stem 70 and cap 74 are made of an HDPE resin and the stem 70 is heat sealed with the tank wall and the cap 74 is heat sealed to the stem 70. The electrical, fuel and vapor lines may extend out of the opening 72 created by the stem 70, and through the corresponding plug or cap 74. To avoid forming the hole 72 associated with the stem 70, it is also possible to close the parison 18 around the stem 70 when the carrier 12 is supported by the mold 54 as it closes, to avoid having any portion of the stem 70 sticking out of the fuel tank 10. In this form, there is no need to cut the stem 70 or apply a cap or plug 74. Finally, one or more service openings 40 may be provided to enable access to the interior of the fuel tank 10, if desired. Alternatively, holes may cut into the tank 10 when service is required, and these holes may be capped or plugged after service.

A modified carrier 12' is shown in FIG. 6 which has an arm 42 rotatable or pivotable about a pivot 44. To mount a fuel system component, for example, the vent valve 24' in an upper portion of the fuel tank 10, the vent valve is disposed on an upper portion of the arm 42 adjacent the distal end of the arm. Upon closing of the mold 54, the parison 18, in the area of the passage 16 of the tank 10, engages the arm 42 and rotates it about the pivot (clockwise as viewed in FIG. 6) to move the valve 24' on the arm 42 from the phantom line to the solid line position shown in FIG. 6. Desirably, the valve 24' may become attached, bonded or adhered to the fuel tank 10 to maintain its position therein relative to the upper wall portion of the fuel tank. The arm 42 may also become attached or adhered to the tank 10 in the area of the passage 16 to limit or prevent movement of the carrier 12 relative to the tank 10.

In summary, the invention relates to a plastic fuel tank 10 molded around and having fuel system components contained therein, such as a fuel pump 28, a fuel filter, fuel level sensors 26, 26' as well as the corresponding connecting lines, some of which lead to the outside of the tank 10. In order to keep the effort for assembling the tank 10 to a minimum, according to the invention, the fuel system components preferably on a carrier 12 are disposed inside the parison when the tank 10 is formed to eliminate assembly of individual components into and on the tank after it is formed and to reduce the number of openings through the tank wall which must be subsequently closed and sealed after the tank is formed.

What is claimed is:

1. A plastic fuel tank for a vehicle having at least one fuel system component therein, comprising:

a body of a polymeric material defining an interior space constructed and arranged to store a quantity of liquid fuel therein and having an opening communicating with the interior space;

a carrier forming a baffle carried by the body and disposed within the interior space with the carrier oriented so that it lies generally perpendicular to the direction of travel of the vehicle in which the fuel tank is mounted; and at least one fuel system component carried by the carrier within the interior space with the carrier with the fuel system component thereon having a size preventing its insertion into the interior space through any opening in the body, and the carrier providing a baffle retarding the surging and splashing of fuel in the tank when the vehicle is moving.

2. The fuel tank of claim 1 wherein the carrier extends generally vertically in the fuel tank when the fuel tank is mounted in the vehicle and divides the fuel tank interior into smaller volume portions.

3. The fuel tank of claim 2 which also comprises a flow path between the carrier and the fuel tank communicating the portions of the fuel tank interior with each other to permit each portion to have the same fuel level.

4. The fuel tank of claim 3 which also comprises feet extending from the carrier element and engaged by the body of the fuel tank to define the flow paths between the carrier and fuel tank.

5. The fuel tank of claim 1 which also comprises a plurality of feet spaced apart on the carrier and extending to the fuel tank body to limit relative movement between the fuel tank and carrier.

6. The fuel tank of claim 5 wherein the feet are connected to the fuel tank body.

7. The fuel tank of claim 5 wherein the feet are adhered to the fuel tank body.

8. The fuel tank of claim 1 wherein the carrier has guideways in which said at least one fuel system component is carried by the carrier to guide movement of said at least one fuel system component relative to the carrier.

9. The fuel tank of claim 1 wherein the carrier has an internal passage communicating with said at least one fuel system component and constructed and arranged to permit fluid communication between said at least one fuel system component and another component of the fuel system.

10. The fuel tank of claim 9 wherein two fuel system components are carried by the carrier and the internal passage communicates with both of said fuel system components.

11. A method of making a vehicle fuel tank having at least one fuel system component therein, comprising the steps of:
   providing a carrier constructed and arranged to form a baffle and to carry at least one fuel system component;
   disposing at least one fuel system component on the carrier; and thereafter
   forming the fuel tank of a polymeric material to its final shape around the carrier with the carrier oriented so that it lies generally perpendicular to the direction of travel of the vehicle in which the fuel tank is mounted and with said at least one fuel system component thereon to provide a fuel tank with at least one fuel system component therein and the carrier providing a baffle retarding the surging and splashing of fuel in the tank when the vehicle is moving.

12. The method of claim 11 wherein the step of forming the fuel tank is accomplished by providing a parison of a polymeric material around the carrier with said at least one fuel system component thereon, placing the parison with the carrier therein into a mold, and closing the mold and forming the parison to its desired final shape within the mold.

13. The method of claim 12 wherein to form the parison to its final shape pressurized air is delivered into the parison to expand it outwardly within the mold.

14. The method of claim 12 wherein to form the parison to its final shape a negative pressure is applied between the mold and the parison to draw the parison outwardly within the mold.

15. The method of claim 11 wherein during the step of forming the fuel tank around the carrier the fuel tank is brought into engagement with the carrier to limit relative movement between the carrier and fuel tank.

16. The method of claim 12 wherein during the step of forming the fuel tank the parison is brought into contact with the carrier to limit the relative movement between the carrier and the fuel tank.

17. The method of claim 16 wherein the parison engages the carrier at a plurality of separate locations so that the carrier is connected at these locations to the fuel tank after it is formed.

18. The method of claim 12 which also comprises the step of removing a portion of a stem of the carrier which extends out of the fuel tank after it is formed and closing and sealing off the opening created by the removal of said stem.

19. The method of claim 12 which also comprises the step of providing a supply of pressurized air between the parison and carrier to prevent the parison from contacting the carrier before the mold is closed.

20. The method of claim 11 wherein the carrier is preformed with a plurality of spaced-apart feet, during the step of forming the fuel tank around the carrier, the fuel tank is brought into engagement with the feet to normally limit relative movement between the fuel tank and the carrier and the feet are constructed and arranged to break away more easily than the fuel tank wall in the event of a vehicle collision to avoid breaking of the fuel tank walls by the collision force of the carrier on the fuel tank walls.

21. The method of claim 11 wherein a plurality of fuel system components are carried by the carrier and at least some of the components have one of a fuel line, vapor line and an electric connector which passes through the fuel tank with all of the lines and connectors which pass through the fuel tank doing so in essentially the same area closely adjacent each other and each opening to communication exteriorly of the formed fuel tank, and all the lines and electric connectors passing through the formed fuel tank are sealed with the fuel tank during forming of the fuel tank around the carrier.

22. The method of claim 21 wherein at least two of the components carried by the carrier are interconnected by a fuel line prior to forming the fuel tank around the carrier and after forming the fuel tank the interconnected fuel line is received wholly within the fuel tank.

23. The method of claim 11 wherein the carrier comprises a plate, a movable arm carried by the plate, at least one fuel system component carried by the arm and spaced from the plate, and during forming of the fuel tank to its final shape it moves the arm relative to the plate to locate the system component carried by the arm to a desired position of this system component in the formed fuel tank.

24. The method of claim 23 wherein movement of the arm by forming the fuel tank moves the system component carried by the arm into engagement with a portion of the formed fuel tank.

25. A method of making a vehicle fuel tank, comprising the steps of:
   providing a parison of polymeric material suitable to be molded into the fuel tank;
   disposing a plurality of fuel system components in the parison before the parison is molded into the fuel tank, at least two of the fuel system components each having one of a fuel line, vapor line and an electric connector; and
   forming the parison into the fuel tank with said at least one fuel system component therein to provide a fuel tank with the plurality of fuel system components therein and at least two of the lines and connectors passing through the formed fuel tank to the exterior of the formed fuel tank with all of the lines and connectors which pass through the formed fuel tank doing so in essentially the same area and closely adjacent each other and each opening to communication exteriorly of the formed fuel tank when forming of the parison is completed.

26. The method of claim 25 which also comprises the steps of providing a carrier and wherein the fuel system component is carried by the carrier with the carrier and fuel system component thereon disposed in the parison.

27. The method of claim 25 wherein at least two of the components carried by the carrier are interconnected by a fuel line prior to forming the fuel tank around the carrier and after forming the fuel tank the interconnected fuel line is received wholly within the fuel tank.

28. The method of claim 25 wherein during forming of the parison into the fuel tank around the carrier, the parison is also formed around and sealed with all the lines and electric connectors passing through the formed fuel tank.

29. The method of claim 26 wherein at least two of the components carried by the carrier are interconnected by a fuel line prior to forming the fuel tank around the carrier and after forming the interconnected fuel line is received wholly within the fuel tank.

30. The method of claim 26 wherein the carrier comprises a plate, a movable arm carried by the plate, at least one fuel system component carried by the arm and spaced from the plate, and during forming of the fuel tank to its final shape it moves the arm relative to the plate to locate the system component carried by the arm to a desired position of this system component in the formed fuel tank.

31. The method of claim 29 wherein the carrier comprises a plate, a movable arm carried by the plate, at least one fuel system component carried by the arm and spaced from the plate, and during forming of the fuel tank to its final shape it moves the arm relative to the plate to locate the system component carried by the arm to a desired position of this system component in the formed fuel tank.

32. The method of claim 30 wherein movement of the arm by forming the fuel tank moves the system component carried by the arm into engagement with a portion of the formed fuel tank.

* * * * *